(No Model.)
I. FOX.
EYEGLASSES.
No. 358,113. Patented Feb. 22, 1887.
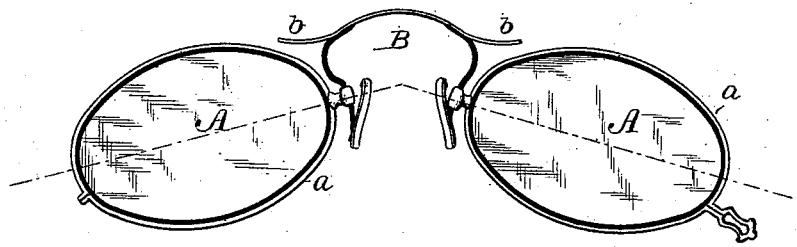
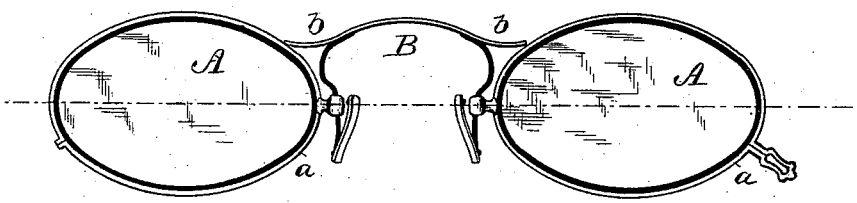
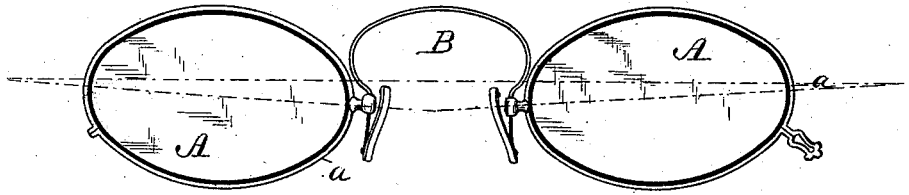
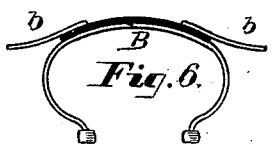
WITNESSES:
John Jolley
F. N. Dixon.
Ivan Fox
INVENTOR.
By his Attorneys
W. C. Strawbridge
Bonsall Taylor

UNITED STATES PATENT OFFICE.

IVAN FOX, OF PHILADELPHIA, PENNSYLVANIA.

EYEGLASSES.

SPECIFICATION forming part of Letters Patent No. 358,113, dated February 22, 1887.

Application filed March 20, 1886. Serial No. 195,904. (No model.)

*To all whom it may concern:*

Be it known that I, IVAN FOX, a citizen of the United States, residing in the city and county of Philadelphia, in the State of Pennsylvania, have invented an Improvement in Eyeglasses, of which the following is a specification.

This invention is an improvement upon an eyeglass-frame invented by me, and patented to me in and by Letters Patent of the United States, No. 296,826, granted April 15, 1884, to which Letters Patent reference is to be made for a better understanding of my improvements.

In eyeglasses it is a desideratum that the major axis of each elliptical lens should, when the glasses are in place upon the nose, occupy a horizontal position, and this is especially important to those wearing lenses known as "cylinders" and employed for the correction of astigmatism, and it is also a desideratum that beyond a certain distance the spring should not too readily expand and the lenses separate or spread apart. The ordinary elliptic one-piece springs employed to connect the two lenses, being connected with the latter or with their frames at but a single point, expand very readily, and when upon the nose frequently permit the major axis of each lens to incline upward at the outer end, as shown in Figure 3 of the drawings. To obviate this tendency of the ordinary spring, I devised the spring shown and described in my Letters Patent No. 296,826 above referred to. A reference to the foregoing patent will, however, make manifest that the two separate reversely-curved springs C, which it is necessary to employ, are connected to the yoke D at such an angle and in such a manner that the constant spreading apart of the lenses in their application to the nose will have a tendency to separate or loosen the union between the outer ends of said reversely-curved springs and said yoke.

The object of the present invention is to obviate the employment of reversely-curved springs in connection with an overhanging connecting-yoke and to secure a union of the advantages derived from the use of the old-fashioned elliptic uniting-spring, of the character shown in Fig. 3, and of the overhanging yoke, of the character set forth in my foregoing patent; and these objects I attain by a construction, a convenient form of a good embodiment of which is represented in Figs. 1, 2, 4, 5, and 6 of the accompanying drawings described in this specification, and hereinafter claimed.

In the accompanying drawings, Fig. 1 is a face view of a pair of eyeglasses embodying my invention in the position which the parts occupy before application to the nose. Fig. 2 is a view similar to Fig. 1 of the same glasses in the position which they occupy when applied to the nose, and in this position it will be observed that the overhanging lugs upon the spring encounter the lens-frames when the major axes are horizontal, and thereby prevent further upward deflection of the outer ends of said axes. Fig. 3 is a front view of a pair of eyeglasses equipped with an old-fashioned spring without the overhanging lugs, showing the tendency of the lenses to an excessive upward set. Figs. 4, 5, and 6 are front elevational details of different constructions of my improvement.

Similar letters of reference indicate corresponding parts.

In the drawings, A represents the lenses, which may be of any desired shape, and *a* the metal rim or frame containing the same, which, however, may be dispensed with.

B is the elliptic connecting-spring, which is connected either with the rims or frames of the lenses, or by any usual method direct with the lenses themselves. The spring is provided with two overhanging lugs or projections, *b*, which constitute abutments or stops for the lenses or lens-frames, and which subserve all the purposes of the connected ends of the reversely-curved springs and yoke of my former patent.

The object of the device being, as stated, to, in effect, retain the old-fashioned elliptic connecting-spring and at the same time provide it with abutments to prevent excessive upward deflection of the lenses, it is obvious that different modes of construction may be resorted to. Thus in the construction shown in Figs. 1 and 2 the central portion of the spring is formed of a single piece of metal, being in effect a yoke, and being integral with the abutments, the spring itself is therefore composed of three pieces of metal, the yoke or connecting member of which is integral with the overhanging lugs, stops, or abutments.

In Fig. 4 the spring is composed of a single continuous piece of metal, while the stops or abutments are likewise composed of a single piece brazed to the spring.

In Fig. 5 the spring is composed of but a single piece of metal, while the overhanging ends, stops, or abutments are two separate pieces separately brazed on.

Finally, in Fig. 6 the spring is composed of three pieces, and the stops or abutments are two separate pieces of metal applied in the manner shown.

The union between the parts of the spring and its abutments may be effectuated by soldering, brazing, riveting, or otherwise, as convenience of manufacture may dictate.

Having thus described my invention, I claim and desire to secure by Letters Patent—

A pair of eyeglasses connected by a flexible spring or bow which is provided with lugs, stops, or kindred abutments which extend longitudinally therefrom into the path of upward movement assumed by the lenses in being applied to the nose, and the free or abutment ends of which stops are, before application, or in the normal set of the lenses, distant from the upper edges of said lenses, substantially as and for the purposes set forth.

In testimony whereof I have hereunto signed my name this 3d day of March, A. D. 1886.

IVAN FOX.

In presence of—
J. BONSALL TAYLOR,
WM. C. STRAWBRIDGE.